US012361895B2

(12) United States Patent
Hwang et al.

(10) Patent No.: US 12,361,895 B2
(45) Date of Patent: Jul. 15, 2025

(54) DISPLAY APPARATUS HAVING NARROW BEZEL

(71) Applicant: LG Display Co., Ltd., Seoul (KR)

(72) Inventors: Su-Jin Hwang, Paju-si (KR); Mi-Young Son, Paju-si (KR); Hong-Jae Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/588,767

(22) Filed: Feb. 27, 2024

(65) Prior Publication Data

US 2024/0290282 A1 Aug. 29, 2024

(30) Foreign Application Priority Data

Feb. 28, 2023 (KR) ........................ 10-2023-0026961

(51) Int. Cl.
*G09G 3/3266* (2016.01)

(52) U.S. Cl.
CPC ... *G09G 3/3266* (2013.01); *G09G 2300/0842* (2013.01)

(58) Field of Classification Search
CPC ......... G09G 3/3266; G09G 2300/0842; H10K 59/131; H10K 59/1213; H10K 59/126
See application file for complete search history.

(56) References Cited

U.S. PATENT DOCUMENTS

2012/0327057 A1* 12/2012 Sakamoto ............ G11C 19/184 345/211
2020/0193911 A1* 6/2020 Lim ..................... G09G 3/3266
2021/0066441 A1* 3/2021 Jung .................... H10K 59/131
2021/0098737 A1* 4/2021 Pang .................... H10K 59/126
2021/0335890 A1* 10/2021 Li ........................ G09G 3/3233
2022/0165990 A1* 5/2022 Lee ...................... H10K 59/874
2023/0138392 A1* 5/2023 Shin .................. H10K 59/8723 257/40

* cited by examiner

*Primary Examiner* — Grant Sitta
(74) *Attorney, Agent, or Firm* — Morgan, Lewis & Bockius LLP

(57) ABSTRACT

A display apparatus according to the present invention comprises a substrate including a display area having a plurality of sub-pixels and non-display area surrounding the display area; a shielding layer on the substrate; a driving transistor in the sub-pixel above the shielding layer, the driving transistor including a semiconductor layer, a gate electrode, a source electrode, and a drain electrode; a light emitting diode in each sub-pixel; and a plurality of signal lines in the non-display area; wherein the signal line includes a first line and a second line, the first line being made of same material as the shielding layer, and the second line being made of same material as the gate electrode.

12 Claims, 8 Drawing Sheets

DISPLAY APPARATUS HAVING NARROW BEZEL

CROSS-REFERENCE TO RELATED APPLICATION

This application claims priority to and the benefit of Republic of Korea Patent Application No. 10-2023-0026961, filed on Feb. 28, 2023, the contents of which are incorporated herein by reference in its entirety.

BACKGROUND

1. Technical Field

The present invention relates to a display apparatus capable of implementing a narrow bezel by reducing a width of a line in a non-display area.

2. Discussion of the Related Art

Recently, as the information age, the interest in information display apparatus that process and display large amounts of information is increasing. In addition, as the demand for using portable information media increases, various lightweight and thin flat panel display apparatus have been developed to meet this demand and are attracting attention.

Among these flat panel display apparatuses, the organic light emitting display apparatus is a self-lighting apparatus that does not require a separate light source such as a backlight, and has advantages in viewing angle, contrast ratio, power consumption, etc., and is used in various fields. It is widely applied.

The display apparatus include a display area for displaying an image and a non-display area outside of the display area.

Meanwhile, the research on narrow bezels has been actively studied recently to minimize the area of the non-display area of the display device, reduce the size and weight of the display device, and make the beautiful display apparatus. However, since the non-display area includes various wiring and various components, there were limits to the implementation of a narrow bezel.

SUMMARY

Accordingly, embodiments of the present disclosure are directed to a display device having a narrow bezel that substantially obviates one or more of the problems due to limitations and disadvantages of the related art.

An aspect of the present disclosure is to provide a display apparatus in which a gate driving unit is formed directly on a substrate.

Another aspect of the present disclosure is to provide the display apparatus that can minimize the bezel area by configuring the signal wiring of the gate driving unit in a plurality of layers to reduce the line width of the signal wiring.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a display apparatus comprises a substrate including a display area having a plurality of sub-pixels and non-display area surrounding the display area; a shielding layer on the substrate; a driving transistor in the sub-pixel above the shielding layer, the driving transistor including a semiconductor layer, a gate electrode, a source electrode, and a drain electrode; a light emitting diode in each sub-pixel; and a plurality of signal lines in the non-display area; wherein the signal line includes a first line and a second line, the first line being made of same material as the shielding layer, and the second line being made of same material as the gate electrode.

A buffer layer is formed on an entire area of the substrate over the shielding layer. The buffer layer is disposed on the first line and the second line is disposed on the buffer layer and an opening is formed in the buffer layer to expose the first line so that the second line is electrically connected to the first line through the opening.

The buffer layer is disposed between the adjacent signal lines so that the adjacent signal liens are insulated for each other.

The first line and the second line may have same width, and the first line and the second line may have different widths.

The non-display area includes a gate driving unit for generating a gate signal to be supplied to the display area. The gate driving unit includes a clock signal block, a high potential voltage block, a stage circuit block, and a low potential voltage block. The signal line is at least one of a clock line disposed in the clock signal block, a first power line disposed in the high potential voltage block, and a second power line disposed in the lower potential voltage block.

A transistor and a storage capacitor are disposed in the stage circuit block. The transistor has the same structure as the driving transistor. The storage capacitor includes the shielding layer, the buffer layer on the shielding layer, and a metal layer on the buffer layer, the metal layer being made of same material as the gate electrode of the driving transistor.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings:

FIG. 8A is the cross-sectional view taken along line II-I' of FIG. 5 and FIG. 8B is the cross-sectional view taken along line II-II' of FIG. 5.

DETAILED DESCRIPTION

Figure 1:
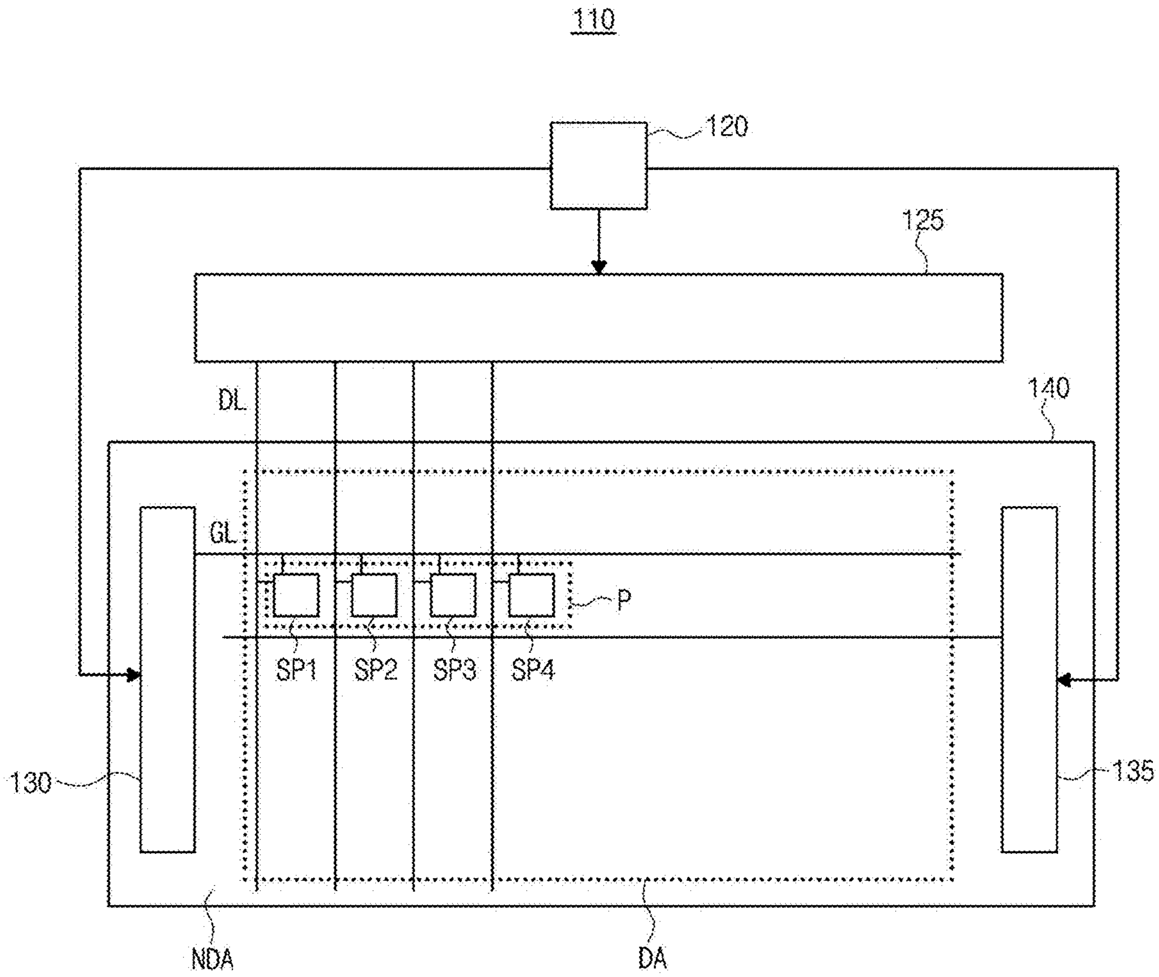
FIG. 1 is a view showing a display apparatus according to an embodiment of the present invention.

Advantages and features of the present disclosure and methods for achieving them will be made clear from embodiments described in detail below with reference to the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined only by the scope of the appended claims.

Shapes, sizes, ratios, angles, numbers, and the like disclosed in the drawings for describing the embodiments of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When terms such as "including," "having," "comprising," and the like mentioned in this disclosure are used, other parts may be added unless the term "only" is used herein. When a component is expressed as being singular, being plural is included unless otherwise specified.

In analyzing a component, an error range is interpreted as being included even when there is no explicit description.

In describing a positional relationship, for example, when a positional relationship of two parts is described as being "on," "above," "below," "next to," or the like, unless "immediately" or "directly" is not used, one or more other parts may be located between the two parts.

In describing a temporal relationship, for example, when a temporal predecessor relationship is described as being "after," "subsequent," "next to," "prior to," or the like, unless "immediately" or "directly" is not used, cases that are not continuous may also be included.

Although the terms first, second, and the like are used to describe various components, these components are not substantially limited by these terms. These terms are used only to distinguish one component from another component. Therefore, a first component described below may substantially be a second component within the technical spirit of the present disclosure.

In describing the components of the disclosure, terms such as first, second, A, B, (a), (b), etc. may be used. These terms are only for distinguishing the elements from other elements, and the essence, order, or number of the elements are not limited by the terms. When it is described that a component is "connected" or "coupled" to another component, the component may be directly connected or coupled to the other component, but may be indirectly connected or coupled to the other component without specifically stated. It should be understood that other components may be "interposed" between components that are connected or can be connected.

As used herein, the term "apparatus" may include a display apparatus such as a liquid crystal module (LCM) including a display panel and a driving unit for driving the display panel, and an organic light emitting display module (OLED module). Further, the term "apparatus" may further include a notebook computer, a television, a computer monitor, a vehicle electric apparatus including an apparatus for a vehicle or other type of vehicle, and a set electronic apparatus or a set apparatus such as a mobile electronic apparatus such as a smart phone or an electronic pad, etc., which are a finished product (complete product or final product) including LCM or OLED module.

Accordingly, the apparatus in the disclosure may include the display apparatus itself such as the LCM, the OLED module, etc., the application product including the LCM, the OLED module, or the like, or the set apparatus, which is the apparatus for end users.

Hereinafter, the disclosure will be described in detail with reference to the accompanying drawings.

FIG. 1 is the schematic block diagram of the organic light emitting display apparatus 110 according to the invention.

As shown in FIG. 1, the organic light emitting display apparatus 100 includes a timing control unit 120, a data driving unit 125, a display panel 140, and first a second driving units 130 and 135.

The image processing unit 102 can generate an image data, a data control signal, and a gate control signal by using the image signal, a data enable signal, a horizontal synchronizing signal, a vertical synchronizing signal, and a clock signal applied from an outer system (not shown) such as a TV system or a graphic card. The timing control unit 120 transmits the generated image data and data control signal to the data driving unit 125, and transmits the generated gate control signal to the first and second gate driving units 130 and 135.

The data driving unit 125 generates a data signal (a data voltage) (Vdata in FIG. 3) using the data control signal and the image data transmitted from the timing control unit 120, and applys the generated data signal to a data lines DL of the display panel 140.

The first and second gate driving units 130 and 135 are disposed inside the display panel 140. The first and second gate driving units 130 and 135 generate a gate signal (gate voltage) using the gate control signal transmitted from the timing control unit 120, and apply the generated gate signal to the gate lines GL.

For example, the gate signal may include a scan signal (Sc in FIG. 4), a sensing signal (Se in FIG. 4), and a light emission signal.

The first and second gate driving units 130 and 135 may be a gate-in-panel (GIP) type that is directly formed in the non-display area on the substrate of the display panel 140 on which the gate lines GL, the data lines DL, and pixels P are formed.

The first and second gate driving units 130 and 135 are disposed in both sides of the display panel 140 in the embodiment of FIG. 1, as an example, but one gate driving unit is disposed in one side of the display panel 140 in other embodiment.

The display panel 140 includes a central display area DA and a non-display area NDA surrounding the display area DA, and displays the image using the gate signal and the data signal Vdata. The display panel 140 includes a plurality of pixels P, a plurality of gate lines GL, and a plurality of data lines DL arranged in the display area DA in order to display the image.

Each of the plurality of pixels P includes first to fourth sub-pixels SP1 to SP4, and the first to fourth sub-pixels SP1 to SP4 are defined by the intersected gate lines GL and data lines DL. The first to fourth sub-pixels SP1 to SP4 are connected to the gate line GL and the data line DL, respectively. For example, the first to fourth sub-pixels SP1 to SP4 may correspond to red, green, blue, and white, respectively.

Figure 4:
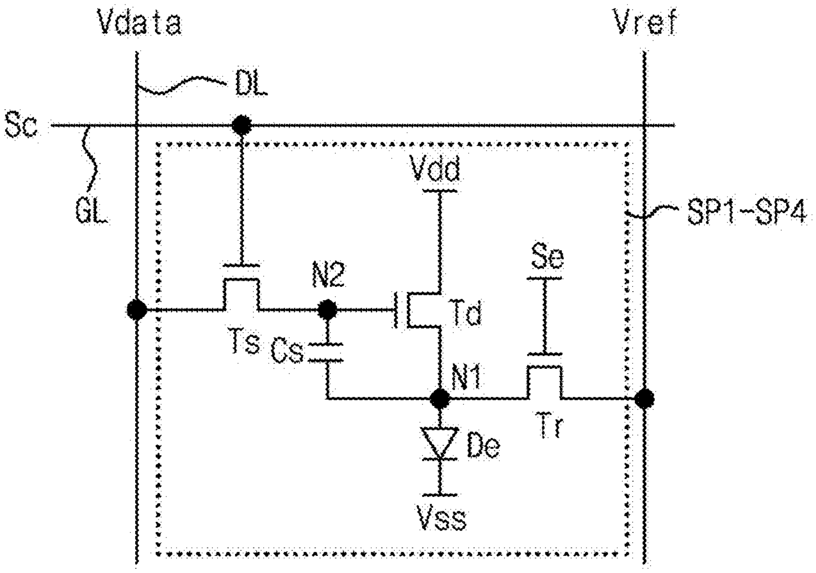
FIG. 4 is the circuit diagram showing the sub-pixel of a 3T1C structure of the display apparatus according to the embodiment of the present invention.

Each of the first to fourth sub-pixels SP1 to SP4 includes a plurality of transistors such as a switching transistor (Ts in FIG. 4), a driving transistor (Td in FIG. 4), and a reference transistor (Tr in FIG. 4), a storage capacitor (Cs in FIG. 4), and a light emitting diode (De in FIG. 4).

The configuration and operation of the gate driving units 130 and 135 and the sub-pixels SP1 to SP4 of the organic light emitting display apparatus 110 will be described with reference to the drawings.

Figure 2:
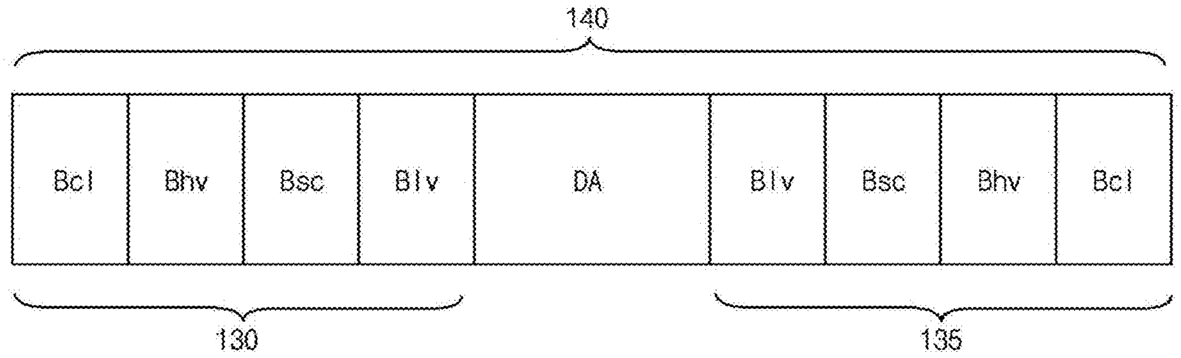
FIG. 2 is a block diagram showing first and second gate driving units and a display panel of a display apparatus according to the embodiment of the present invention.
Figure 3:
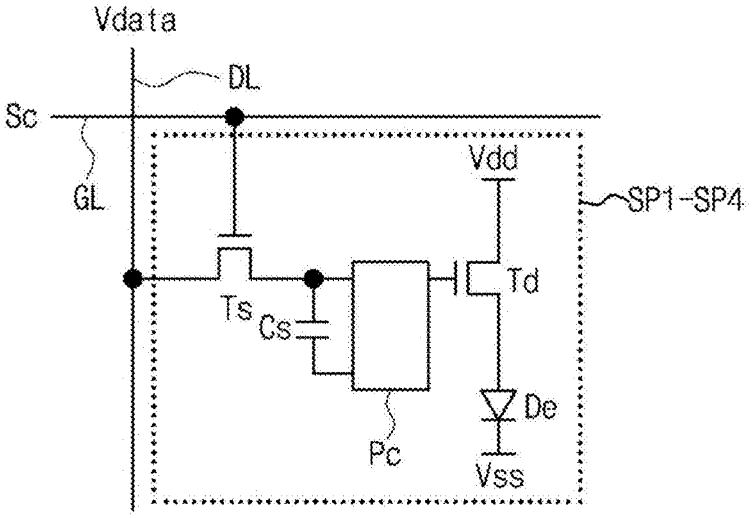
FIG. 3 is a circuit diagram showing a sub-pixel of the display apparatus according to the embodiment of the present invention.

FIG. 2 is a block diagram showing the first and second gate driving units and the display panel of the organic light emitting display apparatus according to the embodiment of the invention, and FIG. 3 is a circuit diagram of the sub-pixel of the organic light emitting display apparatus according to the invention.

As shown in FIG. 2, each of the first and second gate driving units 130 and 135 of the organic light emitting display apparatus according to the invention includes a clock signal block Bcl, a high potential voltage block Bhv, a stage circuit block Bsc, and a low potential voltage block Blv. The display area DA of the display panel 140 is disposed between the first and second gate driving units 130 and 135.

In another embodiment, the clock signal block Bcl, the high potential voltage block Bhv, the stage circuit block Bsc, and the low potential voltage block Blv with respect to the first and second gate driving units 130 and 135 can be arranged in various structures.

Each of the first and second gate driving units 130 and 135 may be a shift register including a plurality of stages connected in cascade.

The clock signal block Bcl is a part where a plurality of clock lines transmitting clock signals used in the stage circuit block Bsc are placed.

For example, the clock signal may include a carry clock to be transmitted and received from one stage to another stage, a scan clock used for generating a scan signal Sc of the gate signal applied to the display area DA of the display panel 140, and a sensing clock used for generating a sensing signal Se of the gate signal applied to the display area DA of the display panel 140.

The clock signal block Bcl may include a carry clock block in which the clock line for transmitting the carry clock is disposed, a scan clock block in which the clock line for transmitting the scan block is disposed, and a sensing clock block in which the clock line for transmitting the sensing clock is disposed.

The high potential voltage block Bhv is a part where a plurality of power lines that transmit the high potential voltage and control signals of the first and second gate driving units 130 and 135 are disposed.

For example, the high potential voltage of the first and second gate driving units 130 and 135 may include the high potential voltage for the shift register and the high potential voltage for the inverter unit of each stage. The control signals of the first and second gate driving units 130 and 135 may include a start signal corresponding to the start of operation of the first stage, a reset signal corresponding to the end of operation of the last stage, and a real-time signal used for generating a compensation signal during real-time compensation operation.

The stage circuit block Bsc is one stage of the shift register, and generates and outputs the gate signal including the carry signal, the scan signal Sc, and the sensing signal Se. The carry signal is transmitted to another stage, and the scan signal Sc and the sensing signal Se are supplied to the display area DA.

For example, the stage circuit block Bsc may include a compensation block for real-time compensation operation, a carry block where the line transmitting and receiving the carry signal to the another state, a logic block for generating substantially a plurality of the output signals, and a buffer block for outputting the scan signal SC and sensing signal Se of the gate signal applied to the display area DA of the display panel 140.

The stage circuit block Bsc may include a plurality of transistor and capacitors.

The low potential voltage block Blv is the part where a plurality of power lines for supplying the low potential voltage of the first and second gate driving units 130 and 135 are disposed.

In the first and second gate driving units 130 and 135, the stage circuit block Bsc generates the carry signal, the scan signal Sc, and the sensing signal Se by the carry clock, the scan clock, and the sensing clock which are transmitted from the clock signal block Bcl. The generated carry signal is transmitted to another stage circuit block Bsc, and the generated scan signal Sc and sensing signal Se are supplied to each sub-pixel SP1 to SP1 of the display area DA.

As shown in FIG. 3, each of the first to fourth sub-pixels SP1 to SP4 of the display panel 140 of the organic light emitting display apparatus 110 according to the embodiment of the invention includes a switching transistor Ts, a driving transistor Td, a compensation unit Pc, a storage capacitor Cs, and a light emitting diode De. At this time, the switching transistor Ts and the driving transistor Td may be an oxide semiconductor thin film transistor or a low temperature poly-crystalline silicon thin film transistor.

The switching transistor Ts is switched according to the scan signal Sc of the gate signal. The gate electrode of the switching transistor Ts is connected to the scan signal Sc, the source electrode of the switching transistor Ts is connected to the first capacitor electrode of the storage capacitor Cs and the compensation unit Pc, and the drain electrode of the switching transistor Ts is connected to the data signal Vdata.

The driving transistor Td is switched according to the voltage of the compensation unit Pc. The gate electrode of the driving transistor Td is connected to the compensation unit Pc, the source electrode of the driving transistor Td is connected to the anode of the light emitting diode De, and the drain electrode of the driving transistor Td is connected to the high potential voltage Vdd.

The compensation unit Pc is connected between the switching transistor Ts, the driving transistor Td, and the storage capacitor Cs to compensate the variations of the threshold voltage Vth of the driving transistor Td.

The storage capacitor Cs stores the data signal Vdata. The first capacitor electrode of the storage capacitor Cs is connected to the source electrode of the switching transistor Ts and the compensation unit Pc, and the second capacitor electrode of the storage capacitor Cs is connected to the compensation unit Pc.

The light emitting diode De is connected between the driving transistor Td and the low potential voltage Vss to emit the light having the brightness proportional to the current of the driving transistor Td. The anode of the light emitting diode De is connected to the source electrode of the driving transistor Td, and the cathode of the light emitting diode De is connected to the low potential voltage Vss.

The data signal Vdata is supplied to the each of the sub-pixels SP1 to SP4 of the display panel 140 from the data driving unit 125, and the gate scan signal Sc is supplied to the each of the sub-pixels SP1 to SP4 of the display panel 140 from the first and second gate driving units 130 and 135.

Each of the first to fourth sub-pixels SP1 to SP4 has one structure among a 3T1C structure including three transistors and one capacitor, a 6T1C structure including six transistors and one capacitor, a 7T1C structure including seven transistors and one capacitor, and 8T1C structure including eight transistors and one capacitor.

Hereinafter, the 3T1C structure of each sub-pixel SP1 to SP4 will be described with reference to the drawings.

FIG. 4 is a circuit diagram showing the sub-pixel of the 3T1C structure of the organic light emitting display apparatus according to the embodiment of the invention, and will be described with reference to FIGS. 1 to 3.

As shown in FIG. 4, each of the first to fourth sub-pixels SP1 to SP4 of the display panel 140 of the organic light emitting display apparatus 110 according to the invention includes a switching transistor Ts, a driving transistor Td, a reference transistor Tr, a storage capacitor Cs, and a light emitting diode De. The switching transistor Ts, the driving transistor (Td), and the reference transistor Tr may be the oxide semiconductor thin film transistor or the low temperature polycrystalline silicon thin film transistor.

The switching transistor Ts is switched according to the scan signal Sc of the gate signal. The gate electrode of the switching transistor Ts is connected to the scan signal Sc, the source electrode of the switching transistor Ts is connected to the first capacitor electrode of the storage capacitor Cs and the gate electrode of the driving transistor Td, and the drain electrode of the switching transistor Ts is connected to the data signal Vdata.

The driving transistor Td is switched according to the voltage of the first capacitor electrode of the storage capacitor Cs. The gate electrode of the driving transistor Td is connected to the source electrode of the switching transistor Ts and the first capacitor electrode of the storage capacitor Cs, the source electrode of the driving transistor Td is connected to the second capacitor electrode of the storage capacitor Cs, the anode of the light emitting diode De, and the source electrode of the reference transistor Tr, and the drain electrode of the driving transistor Td is connected to the high potential voltage Vdd.

The reference transistor Tr is switched according to the sensing signal Se of the gate signal. The gate electrode of the reference transistor Tr is connected to the sensing signal Se, the source electrode of the reference transistor Tr is connected to the source electrode of the driving transistor Td, the second capacitor electrode of the storage capacitor Cs, and the anode of the light emitting diode De, and the drain electrode of the reference transistor Tr is connected to the reference signal Vref.

The storage capacitor Cs stores the data signal Vdata in which the threshold voltage Vth of the driving transistor Td is compensated. The first capacitor electrode of the storage capacitor Cs is connected to the source electrode of the switching transistor Ts and the gate electrode of the driving transistor Td, and the second capacitor electrode of the storage capacitor Cs is connected to the source electrode of the driving transistor Td, the source electrode of the reference transistor Tr, and the anode of the light emitting diode De.

The light emitting diode De is connected between the driving transistor Td and the low potential voltage Vss to emit light with the brightness proportional to the current of the driving transistor Td. The anode of the light emitting diode De is connected to the source electrode of the driving transistor Td, the second capacitor electrode of the storage capacitor Cs, and the source electrode of the reference transistor Tr, and the cathode of the light emitting diode De is connected to the low potential voltage Vss.

The data signal Vdata and the reference signal Vref are supplied from the data driving unit 125 to each sub-pixel SP1 to SP4 of the display panel 140. The scan signal Sc and the sensing signal Se of the gate signal are supplied from the first and second gate driving units 130 and 135 to each sub-pixel SP1 to SP4 of the display panel 140.

The source electrode of the driving transistor Td, the source electrode of the reference transistor Tr, the second capacitor electrode of the storage capacitor, and the anode of the light emitting diode De are connected to each other to form the first node N1. The gate electrode of the driving transistor Td, the source electrode of the switching transistor Ts, and the first capacitor electrode of the storage capacitor Cs are connected to each other to form the second node N2.

In this organic light emitting display apparatus 110, the reference signal Vref is supplied to the first node N1 during the initialization period when the reference transistor Tr is turned on, so that the first and second nodes Initialize N1 and N2. During the writing period when the switching transistor Ts is turned on and off, the data signal Vdata is applied to the second node N2 so that the threshold voltage of the driving transistor Td is stored in the storage capacitor Cs. During the sensing period when the reference transistor Tr is turned on again, the data driving unit 125 detects the threshold voltage of the driving transistor Td stored in the storage capacitor Cs and the detected threshold voltage is transmitted to the timing control unit 120.

Thereafter, the timing control unit 120 modulates the data signal Vdata to generate the compensation data signal whose the threshold voltage is compensated, to supply the generated compensation data signal to each sub-pixel SP1 to SP4 through the data driving unit 125. During the light emission period when the switching transistor Ts is turned on, the current corresponding to the compensation data signal is supplied to the light emitting diode De through the driving transistor Td, so that the light emitting diode De emits light.

Figure 5:
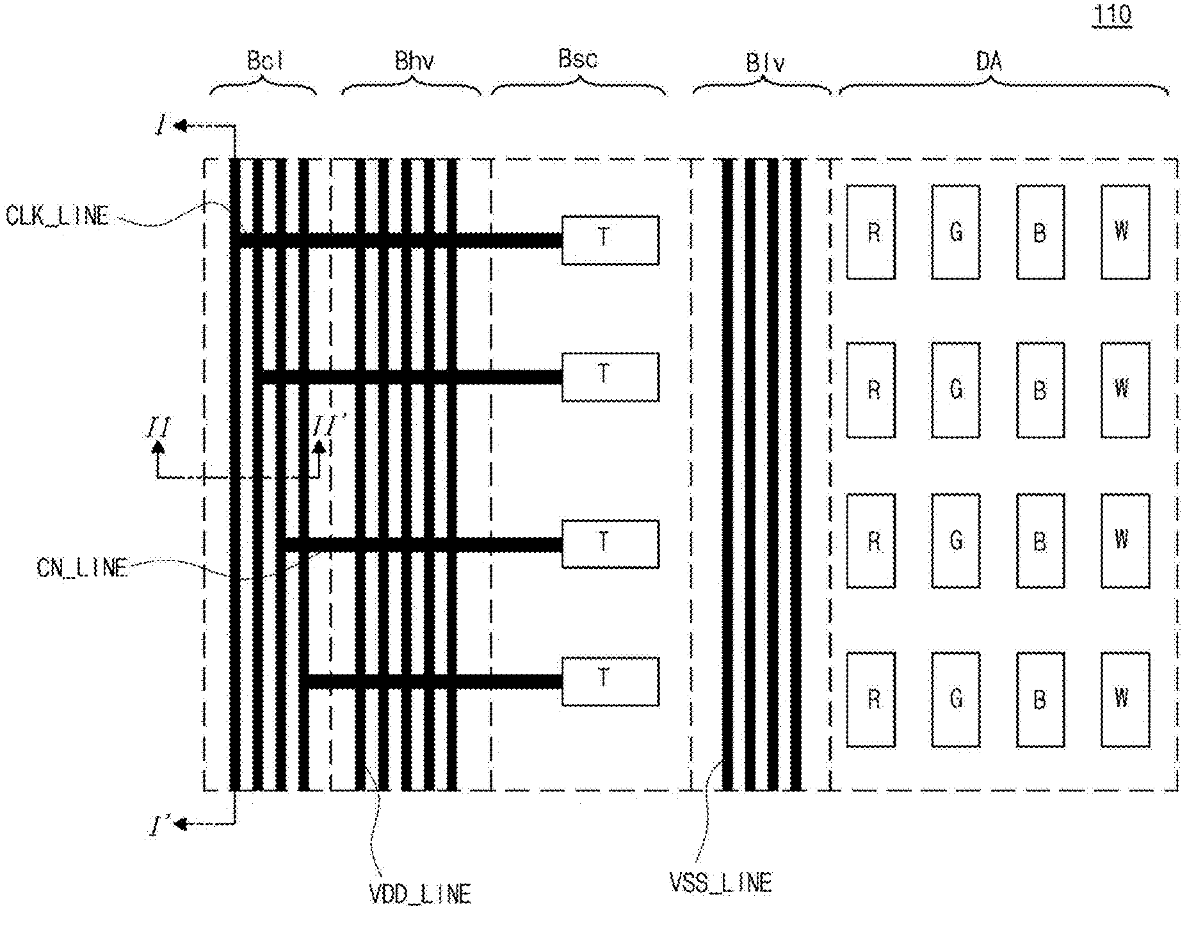
FIG. 5 is the block diagram specifically showing the structure of the gate driving unit and the display panel according to the embodiment of the present invention.

FIG. 5 is the block diagram schematically showing the gate driving unit and display panel of the display device 110 according to the present invention. In reality, the gate driving unit may be placed on both sides of the display area DA, but in the drawings, for convenience of explanation, it is shown on only one side.

As shown in FIG. 5, the gate driving unit includes the clock signal block Bcl, the high potential voltage block Bhv, the stage circuit block Bsc, and the low potential voltage block Blv. The display area DA is disposed on the side of the low potential voltage block Blv.

A plurality of clock lines CLK_LINE are arranged in the clock signal block Bc). The clock lines CLK_LINE extend along the vertical direction (y-direction) and is arranged along the horizontal direction (x-direction) to apply the clock signal supplied from the outside to the stage circuit block Bsc. At this time, the clock signal may include the carry clock for transmitting and receiving one stage of the shift register transmits to another stage of the shift register, the scan clock used to generate the scan signal Sc of the gate signal supplied to the display area DA of the display panel 140, and the sensing clock used to generate the sensing signal Se of the gate signal supplied to the display area DA of the display panel 140.

A plurality of first power lines VDD_LINE are disposed in the high potential voltage block Bhv. The plurality of first power lines VDD-LINE are extended along the vertical direction (y-direction) and are arranged along the horizontal direction (x-direction). Although not shown in the drawing, the first power line VDD-LINE is electrically connected to the display area DA to supply the high potential voltage and the control signals to the display area DA. For example, the high potential voltage may include a high potential voltage for the shift register and a high potential voltage for the inverter part of each stage, and the control signal may include a start signal corresponding to the start of operation of the first stage, a reset signal corresponding to the end of operation of the last stage, and a real-time signal used to generate a compensation signal during real-time compensation operation.

The stage circuit block Bsc is one stage of the spread resistor. Although not shown in the drawing, the stage circuit block Bsc may include a compensation block for real-time compensation operation, a carry block in which the lines for transmitting and receiving the carry signal to other stages are arranged, a logic block for actually generating multiple output signals, and a buffer block for outputting the scan signal Sc and a sensing signal Se of the gate signal supplied to the display area DA of the display panel 140.

A plurality of transistors T for shift resistor are disposed in the stage block Bsc. Further, although not shown in the drawing, the stage block Bsc may include a plurality of storage capacitors. Connection wires CN_LINE are disposed in the stage block Bsc to electrically connect the transistors T to the clock lines CLK_LINE of the clock signal block Bcl. The connection line CN_LINE is perpendicular to the clock line CLK_LINE, so that one end of the connection line CN_LINE is connected to the clock line CLK_LINE and the other end of the connection line CN_LINE may be connected to the source electrode of the transistor T.

A plurality of second power lines VSS_LINE extending along the vertical direction (y-direction) and arranged in the horizontal direction (x-direction) are disposed in the low-potential voltage block Blv. Although not shown in the drawing, a plurality of second power lines VSS_LINE are electrically connected to the display area DA to supply the low potential voltage and control signal to the display area DA.

A plurality of sub-pixels may be arranged in the display area DA. Although not shown in the drawing, the sub-pixel may be defined by a plurality of gate lines and data lines. The sub-pixel may include a red sub-pixel, a green sub-pixel, and a blue sub-pixel. Further, the sub-pixel may include the red sub-pixel, the green sub-pixel, the blue sub-pixel, and a white sub-pixel.

Hereinafter, the structure of the display device 110 according to the present specification will be described in more detail with reference to the attached drawing.

Figure 6:
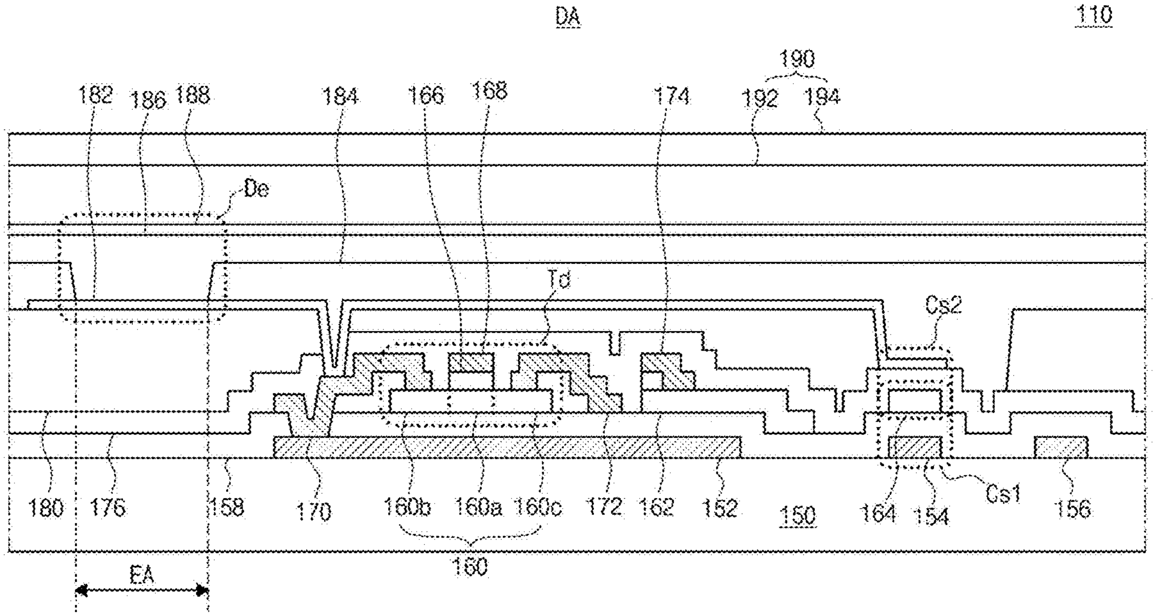
FIG. 6 is the cross-sectional view specifically showing the structure of a sub-pixel of the display apparatus according the embodiment of the present invention.

FIG. 6 is a cross-sectional view showing the structure of each sub-pixel R, G, B, and W of the display area DA of the display device 110 according to the present specification. A plurality of transistors such as the driving transistor and the switching transistor are disposed in each of the sub-pixels R, G, B, and W. However, since the driving transistor and the switching transistor have substantially the same structure, only the driving transistor Td is shown in the drawing for convenience of explanation.

As shown in FIG. 6, a shielding layer 152, a first capacitor pattern 154, and the data line 156 are disposed on the substrate 150. The substrate 150 may be made of a hard material such as a glass or a plastic material, but not limited thereto. For example, the plastic material may include a polyimide, a polymethylmethacrylate, a polyethylene terephthalate, a Polyethersulfone, and a Polycarbonate.

When the substrate 1540 is made of polyimide, the substrate 150 may be made of a plurality of polyimide layers, and an inorganic layer may be further disposed between the polyimide layers, but is not limited thereto.

The shielding layer 152 blocks external light to prevent off-current of the transistor caused by external light, and minimizes a backchannel phenomenon caused by charges trapped in the substrate 150 to prevent afterimages or deterioration of transistor performance.

The shielding layer may be composed of the single layer or the multi layers made of molybdenum (Mo), aluminum (Al), chromium (Cr), gold (Au), titanium (Ti), nickel (Ni), neodymium (Nd), copper (Cu), or an alloy thereof, but is not limited thereto.

The first capacitor pattern 154 and the data line 156 may be formed by the same process as the shielding layer 152, that is, one mask process, but may be formed by a different process. Further, the first capacitor pattern 154 and the data line 156 may be made of the same material as the shielding layer 152. For example, the first capacitor pattern 154, the data line 156, and the shielding layer 152 may be made of the metal, but are not limited thereto.

A buffer layer 158 is disposed on the entire surface of the substrate 150 above the shielding layer 152, the first capacitor pattern 154, and the data line 156. The buffer layer 158 enhances the adhering force between the substrate 150 and the layers thereon. Further, the buffer layer 158 may block various types of defects, such as alkali components flowing out from the substrate 150. Further, the buffer layer 158 may delay diffusion of moisture or oxygen penetrating into the substrate 150.

The first buffer layer 158 may be a single layer made of silicon oxide (SiOx) or silicon nitride (SiNx), or multi-layers thereof. When the buffer layer 158 is made of multiple layers, SiOx and SiNx may be alternately formed. The buffer layer 158 may be omitted based on the type and material of the substrate 150, the structure and type of the thin film transistor, and the like.

A driving transistor Td is formed in one area above on the buffer layer 158. In the figure, the driving transistor Td of a top gate structure is shown, but the driving transistor Td is not limited to this structure and may be formed in other structures such as the transistor of a bottom gate structure.

The driving transistor Td includes an active layer 160 on the buffer layer 158, a gate insulating layer 166, a gate electrode 168, a source electrode 170, and a drain electrode 172.

The active layer 160 may be made of a polycrystalline semiconductor. For example, the polycrystalline semiconductor may be made of low temperature poly silicon (LTPS) having high mobility, but is not limited thereto. The semiconductor pattern 112 may be made of an oxide semiconductor. For example, the active layer 160 may be made of one of IGZO (Indium-gallium-zinc-oxide), IZO (Indium-zinc-oxide), IGTO (Indium-gallium-tin-oxide), and IGO (Indium-gallium-oxide), but is not limited thereto.

The active layer 160 includes a channel region 112*a* in a central region and a source region 112*b* and a drain region 112*c* at the both sides of the channel region 112*a*. The channel region 160*a* may be made of a pure semiconductor material not doped with impurities, and the source region 160*b* and drain region 160*c* may be made of a semiconductor material doped with impurities.

The gate insulating layer 168 may be formed over the channel region 160*a*, the source region 160*b*, and the drain region 160*c* of the active layer 160. The gate insulating layer 168 may be composed of a single layer or multiple layers made of an inorganic material such as SiOx or SiNx, but is not limited thereto.

The gate electrode 168, the source electrode 170, and the drain electrode 172 are respectively disposed at the area corresponding to the channel region 160*a*, the source region 160*b*, and the drain region 160*c* of the active layer 160 on the gate insulating layer 166.

The gate electrode 168, source electrode 170, and drain electrode 172 are disposed on the same layer. At this time, the gate electrode 168, source electrode 170, and drain electrode 172 may be formed by the same process, that is, one mask process.

The gate electrode 168, source electrode 170, and drain electrode 172 are composed of single layer or multiple layer made of molybdenum (Mo), aluminum (Al), chromium (Cr), gold (Au), titanium (Ti), nickel (Ni), and neodymium (Nd), copper (Cu), or an alloy thereof, but is not limited thereto.

Meanwhile, a semiconductor layer 162 and a second capacitor pattern 164 are disposed on the buffer layer 158. The semiconductor layer 162 and the second capacitor pattern 164 are formed by the same process as the active layer 160 and may be made of the same semiconductor material.

A patterned gate insulating layer 166 is formed on the semiconductor layer 162, and a gate line is disposed on the gate insulating layer 166 corresponding to the semiconductor layer 162. The gate line 174 may be made of the same material as the gate electrode 168, the source electrode 170, and the drain electrode 172 through the same process.

The second capacitor pattern 164 is disposed in the area corresponding to the first capacitor pattern 154 on the buffer layer 158. The first capacitor pattern 154, buffer layer 158, and second capacitor pattern 164 form the first storage capacitor Cs1.

In this driving transistor Td, the gate electrode 168 is not contacted with the channel region 160*a* of the active layer 160. The source electrode 170 of the driving transistor Td is contacted with the shielding layer 152 through the contact hole of the buffer layer 158 and contacted with the source region 160*b* of the active layer 160 through the side surface of the gate insulating layer 166. The drain electrode 172 of the driving transistor Td is contacted with the drain region 160*c* of the active layer 160 through the side surface of the gate insulating layer 166.

Further, the gate line 174 is contacted with the semiconductor layer 162 through the side surface of the gate insulating layer 166.

An interlayer insulating layer 176 is disposed on the entire area of the substrate 150 where the driving transistor Td is disposed. The interlayer insulating layer 176 may be composed of a single layer or multiple layers made of an inorganic material such as silicon nitride (SiNx) or silicon oxide (SiOx), but is not limited thereto.

An overcoat layer 180 is disposed on the entire surface of the substrate over the interlayer insulating layer 176. The overcoat layer 180 is made of at least one material of organic insulating materials such as BCB (Benzo Cyclo Butene), acryl resin, epoxy resin, phenolic resin, polyamide resin, and polyimide resin, but is not limited thereto.

The overcoat layer 180 may be omitted based on the structure and the type of the thin film transistor, the material of the interlayer insulating layer 176, etc.

A light emitting diode De is disposed on the overcoat layer 180. The light emitting diode De includes a first electrode 182, a light emitting layer 186, and a second electrode 188.

The first electrode 182 is disposed on the over coat layer 180 and electrically connected to the source electrode 170 of the driving transistor Td through the contact hole formed in the interlayer insulating layer 176 and the overcoat layer 180.

When the display apparatus 110 is a bottom emission type display apparatus, the first electrode 182 may be made of the transparent conductive material such as ITO or IZO.

When the display apparatus 110 is a top emission type display apparatus, the first electrode 182 may be made of at least one of silver (Ag), aluminum (Al), gold (Au), molybdenum (Mo), tungsten (W), chromium (Cr), or alloys thereof.

The first electrode 182 is extended from the light emitting area EA to be overlapped with the second capacitor pattern 164, so that the second capacitor pattern 164, the interlayer insulating layer 176, and the first electrode 182 forms a second storage capacitor Cs2.

A bank layer 184 is formed at the boundary between the sub-pixels on the overcoat layer 180. The bank layer 184 may be a kind of barrier rib defining R, G, and B sub-pixels. The bank layer 184 is made of at least one material of the inorganic insulating material such as SiNx or SiOx, the organic insulating material such as Benzo Cyclo Butene, acrylic resin, epoxy resin, phenolic resin, polyamide resin, or the photosensitizer including black pigment, but is not limited thereto. The bank layer 184 may be made of the light shielding material consisting of at least one of color pigment, organic black, and carbon to prevent light of a specific color output from adjacent pixels from being mixed and output.

The bank layer 184 has an opening to cover the edge of the first electrode 182 and expose the central part of the first electrode 182, and the opening may be correspondent with the light emitting area EA of the display device 110.

Although not shown in the drawing, a spacer may be disposed on the bank layer 184.

A light emitting layer 186 is disposed in the opening of the bank layer 184. The light emitting layer 186 is formed on the upper surface of the first electrode 182, the inclined surface of the bank layer 184, or the partial region of the upper surface of the bank layer 184. The light emitting layer 186 is formed in the R, G, and B sub-pixels and may include an R-emitting layer for emitting red light, a G-emitting layer for emitting green light, and a B-emitting layer for emitting blue light.

Further, the light emitting layer 186 may include a W-emitting layer for emitting white light. Although not shown in the drawing, when the light emitting layer 186 is the W-light emitting layer, a color filter layer may be further included. For example, when the display apparatus 110 is the bottom emission type, an R-color filter layer, a G-color filter layer, and a B-color filter layer may be respectively disposed in the corresponding sub-pixels over the interlayer insulating layer 176. When the display apparatus 110 is the top emission type, the R-color filter layer, the G-color filter layer, and the B-color filter layer may be respectively disposed in the corresponding sub-pixels over the light emitting diode De.

The light emitting layer 186 may include an organic light emitting layer, an inorganic light emitting layer, a nano-sized material layer, a quantum dot layer, a micro LED light emitting layer, or a mini LED light emitting layer, but is not limited thereto.

The light emitting layer 186 may further include an electron injecting layer for injecting electrons into the light emitting layer, a hole injecting layer for injecting holes into the light emitting layer, an electron transporting layer for transporting the injected electrons to the light emitting layer, a hole transporting layer for transporting the injected holes to the light emitting layer, an electron blocking layer, and a hole blocking layer, but is not limited thereto.

The second electrode 188 is disposed on the light emitting layer 186 and may be formed of the single layer or the multi layers made of the metal or the alloy thereof. Further, the second electrode 188 may be made of the transparent metal oxide material such as ITO or IZO, but is not limited thereto.

When the display apparatus 110 is the bottom emission type, the second electrode 188 may be the reflective electrode made of the opaque conductive material. For example, the second electrode 188 may be made of at least one or more of silver (Ag), aluminum (Al), gold (Au), molybdenum (Mo), tungsten (W), chromium (Cr), or alloys thereof.

When the display apparatus 110 is the top emission type, the second electrode 188 may be made of the translucent conductive material that transmits light. For example, the second electrode 188 may be made of at least one or more of the alloys such as LiF/Al, CsF/Al, Mg:Ag, Ca/Ag, Ca:Ag, LiF/Mg:Ag, LiF/Ca/Ag, or LiF/Ca:Ag.

The light emitting diode De may be formed in a tandem structure. The tandem structure may include a plurality of organic light emitting layers and a charge generating layer disposed between the organic light emitting layers. The charge generating layer is disposed to adjust the charge balance between the plurality of organic light emitting layers, and may be formed of a plurality of layers including a first charge generating layer and a second charge generating layer. The charge generating layer may include an N-type charge generating layer and a P-type charge generating layer. In this case, the charge generating layer may be formed of the organic layer doped with an alkali metal such as Li, Na, K, or Cs or an alkaline earth metal such as Mg, Sr, Ba, or Ra, but is not limited thereto.

An encapsulating layer 190 is formed on the entire area of the substrate 150 over the light emitting diode De. When the light emitting diode De is exposed to impurities such as moisture or oxygen, a pixel shrinkage phenomenon in which the light emitting area is reduced or the defect such as a dark spot in the light emitting area may occur. Further, moisture or oxygen penetrating into the light emitting diode De oxidizes the metal electrode. The encapsulating layer 190 blocks impurities such as the oxygen and the moisture from the outside to prevent defects of the light emitting diode De and various electrodes.

The encapsulation layer 190 may be formed in a multi-layer structure. When the display device 110 is the bottom emission type, the encapsulation layer 190 may include a first encapsulation layer 192 and a second encapsulation layer 194. At this time, the first encapsulation layer 192 is made of at least one material of acryl resin, epoxy resin, phenolic resin, polyamide resin, polyimide resin, non-photosensitive organic insulating material such as polyethylene and silicon oxycarbon (SiOC), and photosensitive organic insulating material such as photo acrylic. The second encapsulation layer 194 may be made of the metal.

Although not shown in the drawing, when the display apparatus 110 is the top emission, the encapsulation layer 190 may include a first encapsulation layer, a second encapsulation layer on the first encapsulation layer, and a third encapsulation layer on the second encapsulation layer. At this time, the first encapsulation layer and the third encapsulation layer may be made of an inorganic material such as SiOx or SiNx, but are not limited thereto. The second encapsulation layer is made of at least one material of acryl resin, epoxy resin, phenolic resin, polyamide resin, polyimide resin, non-photosensitive organic insulating material such as polyethylene and silicon oxycarbon (SiOC), and photosensitive organic insulating material such as photo acrylic. The second encapsulation layer 194 may be made of the metal.

Figure 7:
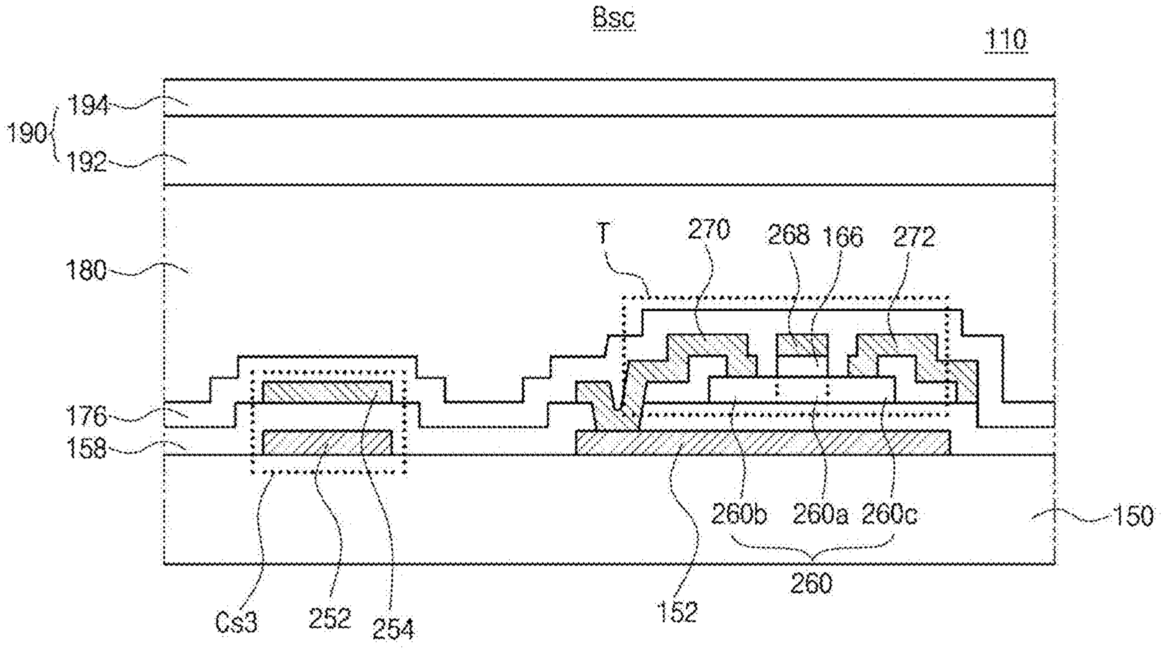
FIG. 7 is the cross-sectional view specifically showing the structure of a stage circuit block of the display apparatus according to the embodiment of the present invention.

FIG. 7 is the cross-sectional view showing the structure of the stage circuit block Bsc of the display apparatus 110 according to the present invention.

As shown in FIG. 7, the transistor T and the storage capacitor Cs3 are disposed in the stage circuit block Bsc. The transistor T is the shift register transistor. A plurality of transistors T are disposed in the stage circuit block Bsc, but since these plurality of transistors T have the same structure, only one transistor T is shown in the drawing.

The transistor T for the shift register is disposed 158 in the area corresponding to the blocking layer 152 on the buffer layer 158, and may have the same structure as the driving transistor Td of the sub-pixel. That is, the transistor T for the shift register includes the active layer 260 on the buffer layer 158, the gate electrode 2368 in the area corresponding to the channel region 260*a* of the active layer 260 on the gate insulating layer 166, the source electrode 270, and the drain electrode 272. At this time, the gate electrode 268, the source electrode 270, and drain electrode 272 are made of the same material (e.g., metal) by the same process and are disposed on the same layer. Further, the gate electrode 268, source electrode 270, and drain electrode 272 of the transistor T for the shift register may be formed of the same material by the same process as the gate electrode 168, the source electrode, and the drain electrode of the driving transistor.

The storage capacitor Cs3 may be formed of the first electrode layer 252, the second electrode layer 254, and the buffer layer 158 therebetween. The first electrode layer 252 may be made of the same material by the same process as the shielding layer 152. The second electrode layer 254 is made of the same material as the gate electrode 168 of the driving transistor Td, the source electrode 170 of the driving transistor Td, the drain electrode 172 of the driving transistor Td, the gate electrode 268 of the shift register transistor, the source electrode 270 of the shift register transistor, and the drain electrode 272 of the shift register transistor by same process.

The encapsulation layer 190 is disposed on the shift register transistor T and the storage capacitor Cs3.

Figure 8A:
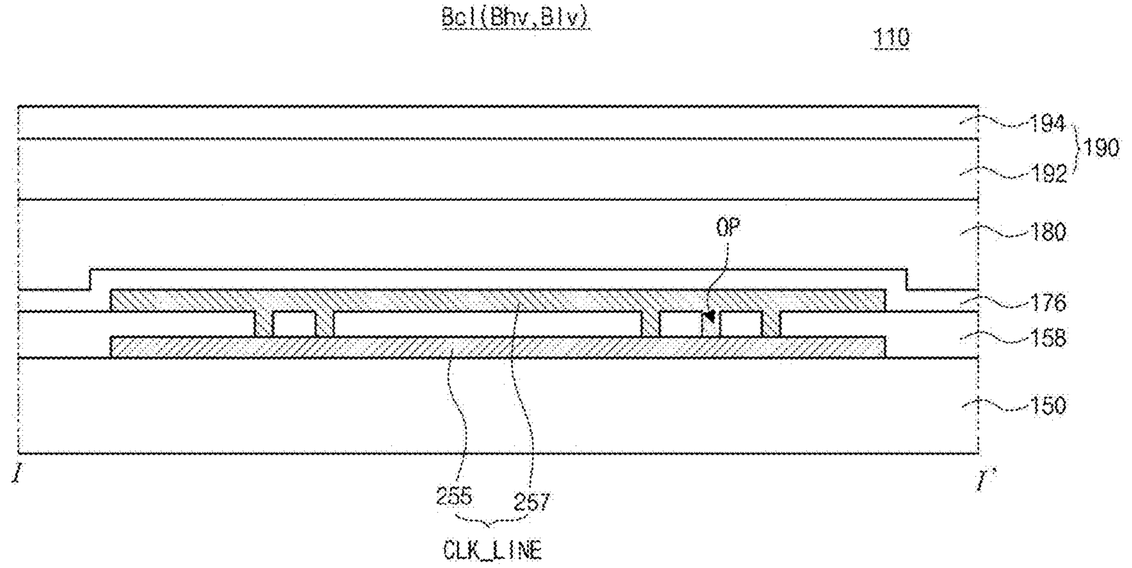
FIGS. 8A and 8B are views showing the structure of a clock signal block, where
Figure 8B:
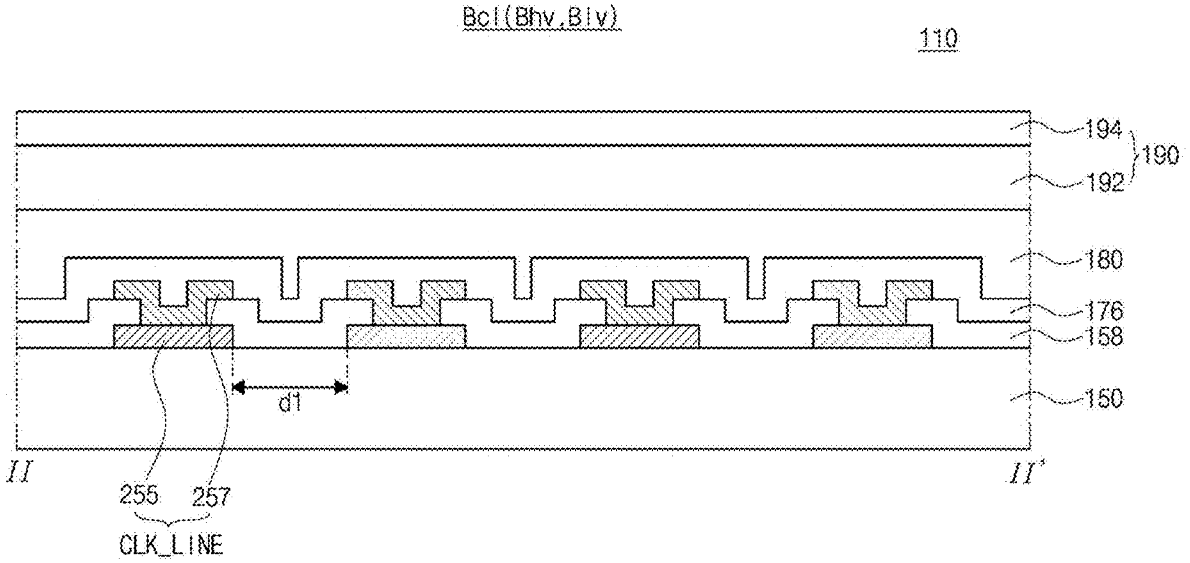

FIGS. 8A and 8B are diagrams showing the structure of the clock signal block Bcl respectively, where FIG. 8A is the cross-sectional view taken along line II-I' of FIG. 5 and FIG. 8B is the cross-sectional view taken along line II-II' of FIG. 5. At this time, since the structures of the clock signal block Bcl, the high potential voltage block Bhv, and the low potential voltage block Blv are substantially the same, by explaining only the structure of the clock signal block Bcl, the high potential voltage block Bhv and the structure description of the low potential voltage block Blv is replaced.

As shown in FIGS. 8A and 8B, the plurality of clock lines CLK_LINE extend along the y-direction (vertical direction of the display apparatus 110) with the predetermined width and arranged along the x-direction (vertical direction of the display device 110) in the predetermined interval.

The clock line CLK_LINE may be formed of the double layer of a first line 255 disposed on the substrate 150 and a second line 257 disposed on the first line 255. The first line 255 may be made of the same material by the same process as the blocking layer 152 of the display area DA and the stage circuit block Bsc. The second line 257 may be made of the same material by the same process as the gate, source, and drain electrode 168, 170, and 172 of the driving transistor Td of the display area DA, and the gage electrode 268, the source electrode 270, the drain electrode 272 of the shift register transistor T in the stage circuit block Bsc. The first line 255 and the second line 257 may be formed with the same width, but may be formed with different widths.

As described above, since the clock line CLK_LINE is composed of double layers in the present invention, the following effects can be achieved. Since the clock line CLK_LINE is the line through which the clock signal is input and transmitted, the quality of the video is deteriorated when the signal is delayed by the resistance. In particular, as the area of the display apparatus 110 is increased, the length of the clock line CLK_LINE is increased so that the signal is delayed.

The best way to prevent signal delay is to form the clock line CLK_LINE with low-resistance metal. However, since the low-resistance metals are expensive, the manufacturing cost is increased. Further, as the metal material should be changed, the manufacturing process must be redesigned.

Another way to prevent signal delay is to increase the width of the clock line CLK_LINE. However, in this case, as the width of the clock line CLK_LINE is increased, the width of the clock signal block Bcl (and the width of the high potential voltage block Bhv and the low potential voltage block Blv) is increased. As a result, the area of the bezel of the display apparatus 110 is increased.

In the present invention, since the clock line CLK_LINE is formed as a double layer, signal delay can be prevented without forming the clock wire CLK_LINE with existing metal or increasing the width of the clock wire CLK_LINE. Accordingly, it is possible to prevent the increase of the manufacturing cost or the increase of the bezel area of the display apparatus 110.

The buffer layer 158 may be disposed on the first line 255 of the clock line CLK_LINE, and the second line 257 may be disposed on the buffer layer 158. At this time, a portion of the buffer layer 158 above the first line 255 is removed to form an opening OP so that the first line 255 is exposed to the outside through the opening OP. The second line 257 formed on the buffer layer 158 is electrically connected to the first line 255 through the opening OP.

As the buffer layer 158 is interposed between the first line 255 and the second line 257, the following effects can be obtained.

Figure 9:
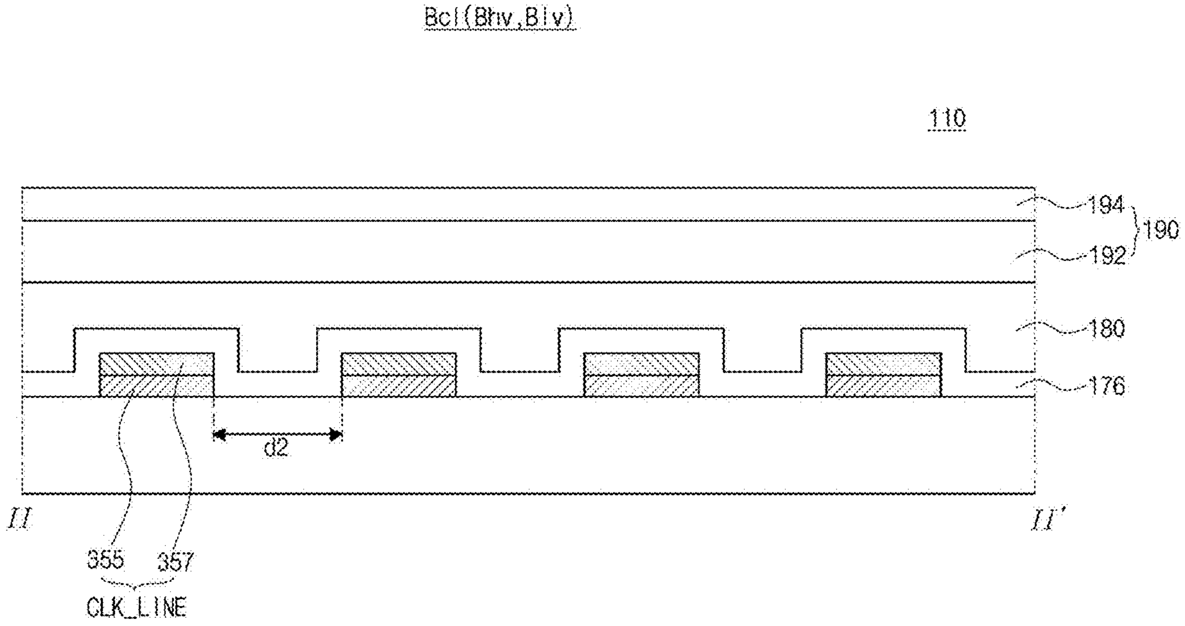
FIG. 9 is the view showing another structure of a clock line of the display apparatus according to the present invention.

FIG. 9 is the diagram showing another structure of the clock line CLK_LINE of the display apparatus 110 according to the present invention, and is the cross-sectional view taken along line II-II' of FIG. 5.

As shown in FIG. 9, in the display apparatus 110 of this structure, the clock line CLK_LINE includes the first line 355 and the second line 357 on the first line 355. That is, the buffer layer is not disposed between the first line 355 and the second line 357, and the second line 357 is formed directly on the upper surface of the first line 355.

When comparing the display apparatus 110 with the structure shown in FIGS. 8A and 8B and the structure shown in FIG. 9, there are the following differences.

In the structure shown in FIGS. 8A and 8B, since the buffer layer 158 made of the insulating material is disposed between adjacent first lines 255, the clock signal applied through the first line 255 is relatively less affected by the adjacent first line 255.

On the other hand, in the structure shown in FIG. 9, since the buffer layer 158 is not disposed between the adjacent first lines 355, the clock signal applied through the first line 255 is relatively greatly affected by the adjacent first line 255.

Therefore, in the structure shown in FIG. 9, the distance d2 between the first lines 355 must be increased to prevent signal distortion between the adjacent first lines 355. That is, compared to the structure illustrated in FIGS. 8A and 8B, a gap between the first lines 355 in the structure illustrated in FIG. 9 is increased (d1<d2).

This means that compared to the structure shown in FIG. 9, the width of the clock signal block Bcl, the high potential voltage block Bhv, and the low potential voltage block Blv can be reduced in the display apparatus 110 shown in FIGS. 8A and 8B. Therefore, in the case of the display apparatus 110 having a structure illustrated in FIGS. 8A and 8B, the area of the bezel of the display apparatus 110 may be further reduced by interposing the buffer layer 158 between the first line 255 and the second line 257.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

What is claimed is:

1. A display apparatus, comprising:

a substrate including a display area having a plurality of sub-pixels and non-display area surrounding the display area;

a shielding layer on the substrate;

a buffer layer formed on an entire area of the substrate over the shielding layer;

a driving transistor in the sub-pixel above the shielding layer, the driving transistor including a semiconductor layer, a gate electrode, a source electrode, and a drain electrode;

a light emitting diode in each sub-pixel; and a plurality of signal lines in the non-display area, wherein the signal line includes a first line and a second line, the first line being made of same material as the shielding layer, and the second line being made of same material as the gate electrode, wherein the buffer layer is disposed on the first line and the second line is disposed on the buffer layer, and wherein an opening is formed in the buffer layer to expose the first line so that the second line is electrically connected to the first line through the opening.

2. The display apparatus of claim 1, wherein the buffer layer is disposed between the adjacent signal lines.

3. The display apparatus of claim 1, wherein the first line and the second line have same width.

4. The display apparatus of claim 1, wherein the first line and the second line have different widths.

5. The display apparatus of claim 1, wherein the non-display area includes a gate driving unit for generating a gate signal to be supplied to the display area.

6. The display apparatus of claim 5, wherein the gate driving unit includes a clock signal block, a high potential voltage block, a stage circuit block, and a low potential voltage block.

7. The display apparatus of claim 6, wherein the signal line is at least one of a clock line disposed in the clock signal block, a first power line disposed in the high potential voltage block, and a second power line disposed in the lower potential voltage block.

8. The display apparatus of claim 6, further comprising a shift register transistor and a storage capacitor disposed in the stage circuit block.

9. The display apparatus of claim 8, wherein the transistor has the same structure as the driving transistor.

10. The display apparatus of claim 9, wherein the storage capacitor includes:

the shielding layer;

the buffer layer on the shielding layer; and a metal layer on the buffer layer, the metal layer being made of same material as the gate electrode of the driving transistor.

11. A display apparatus comprising:

a substrate including a display area having a plurality of subpixels;

a gate in panel circuit unit disposed in outside of the display area on the substrate, the gate in panel circuit unit including a clock signal block, a high potential voltage block, a state circuit block, and a low potential voltage block;

a shielding layer disposed in the display area and the gate in panel circuit unit;

a driving transistor disposed in the sub-pixel over the shielding layer;

a light emitting diode in the sub-pixel over the substrate; and a plurality of signal lines disposed at least one block of the clock signal block, the high potential voltage block, the state circuit block, and the low potential voltage block for transmitting signal, wherein the signal line includes multi layers arranged with at least one insulating layer therebetween, and wherein the multi layers are electrically connected for each other through an opening formed in the insulating layer.

12. The display apparatus of claim 11, wherein the signal line includes:

a first line made of same material as the shielding layer; and a second line made of same material as an electrode of the driving transistor.

* * * * *